US 8,782,370 B2

(12) United States Patent
Rubowitz

(10) Patent No.: US 8,782,370 B2
(45) Date of Patent: Jul. 15, 2014

(54) SELECTIVE DATA STORAGE IN LSB AND MSB PAGES

(75) Inventor: Amit Rubowitz, Modi'in (IL)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 13/426,799

(22) Filed: Mar. 22, 2012

(65) Prior Publication Data

US 2012/0290768 A1 Nov. 15, 2012

Related U.S. Application Data

(60) Provisional application No. 61/486,284, filed on May 15, 2011.

(51) Int. Cl.
*G06F 12/02* (2006.01)

(52) U.S. Cl.
CPC .... *G06F 12/0253* (2013.01); *G06F 2212/1024* (2013.01); *G06F 2212/7205* (2013.01)
USPC .................... 711/165; 711/103; 711/E12.009

(58) Field of Classification Search
CPC .............. G06F 12/023; G06F 12/0253; G06F 2212/1024; G06F 2212/7205
USPC .................... 711/103, 165, E12.008, E12.009
See application file for complete search history.

(56) References Cited

U.S. PATENT DOCUMENTS

| | | | |
|---|---|---|---|
| 2006/0004957 A1 | 1/2006 | Hand, III et al. | |
| 2008/0016308 A1 | 1/2008 | Bartley et al. | |
| 2008/0082776 A1 | 4/2008 | Spielberg et al. | |
| 2008/0104309 A1 * | 5/2008 | Cheon et al. | 711/103 |
| 2008/0235467 A1 | 9/2008 | Tagawa | |
| 2008/0291731 A1 | 11/2008 | Erez | |
| 2009/0049234 A1 | 2/2009 | Oh | |
| 2010/0169586 A1 | 7/2010 | Chang et al. | |
| 2010/0169602 A1 * | 7/2010 | Hulbert et al. | 711/165 |
| 2010/0169604 A1 * | 7/2010 | Trika et al. | 711/170 |
| 2011/0010489 A1 | 1/2011 | Yeh | |
| 2011/0029718 A1 * | 2/2011 | Frickey et al. | 711/103 |
| 2011/0225347 A1 * | 9/2011 | Goss et al. | 711/103 |
| 2011/0264843 A1 * | 10/2011 | Haines et al. | 711/103 |
| 2012/0030413 A1 * | 2/2012 | Miyagawa et al. | 711/103 |
| 2012/0089766 A1 * | 4/2012 | Yu et al. | 711/103 |
| 2012/0102276 A1 * | 4/2012 | Haines et al. | 711/154 |
| 2012/0191937 A1 * | 7/2012 | Feldman et al. | 711/170 |

OTHER PUBLICATIONS

International Search Report Application No. 12167837.9-1229 Issued on Sep. 20, 2012, pp. 1-3.

(Continued)

*Primary Examiner* — Hal Schnee
(74) *Attorney, Agent, or Firm* — Meyertons, Hood, Kivlin, Kowert & Goetzel, P.C.

(57) ABSTRACT

A method for data storage includes providing a memory, which includes multiple groups of memory cells and is configured to concurrently store first data using a first storage configuration having a first access time, and second data using a second storage configuration having a second access time, longer than the first access time, such that each memory cell in each of the groups stores at least one bit of the first data and one or more bits of the second data. Data items are accepted for storage in the memory. The accepted data items are classified into a fast-access class and a normal-access class. The data items in the fast-access class are stored in the memory using the first storage configuration, and the data items in the normal-access class are stored in the memory using the second storage configuration.

25 Claims, 2 Drawing Sheets

(56) References Cited

OTHER PUBLICATIONS

International Search Report Application No. PCT/IB2012/052376 Issued on Oct. 1, 2012, pp. 1-2.

Office Action and translation thereof in corresponding Korean Patent Application No. 10-2012-51422, Jul. 29, 2013, pp. 1-7.
Preliminary Report on Patentability from PCT/IB2012/052376, mailed Nov. 28, 2013, pp. 1-2.

* cited by examiner

SELECTIVE DATA STORAGE IN LSB AND MSB PAGES

CROSS-REFERENCE TO RELATED APPLICATIONS

This application claims the benefit of U.S. Provisional Patent Application 61/486,284, filed May 15, 2011, whose disclosure is incorporated herein by reference.

FIELD OF THE INVENTION

The present invention relates generally to memory systems, and particularly to methods and systems for data storage in multi-level memory devices.

BACKGROUND OF THE INVENTION

Various techniques are known in the art for storing data in memory according to the usage pattern of the data. For example, U.S. Patent Application Publication 2009/0049234, whose disclosure is incorporated herein by reference, describes a storage scheme that stores data in a solid state memory including first and second memory layers. A first assessment is executed to determine whether received data is hot data or cold data. Received data which is assessed as hot data is stored in the first memory layer, and received data which is assessed as cold data is stored in the second memory layer. Further, a second assessment is executed to determine whether the data stored in the first memory layer is hot data or cold data. Data which is then assessed as cold data during the second assessment is migrated from the first memory layer to the second memory layer.

As another example, U.S. Patent Application Publication 2011/0010489, whose disclosure is incorporated herein by reference, describes a logical block management method for managing a plurality of logical blocks of a Flash memory device. The method includes providing a Flash memory controller, and grouping the logical blocks into a plurality of logical zones, wherein each logical block maps to one of the logical zones. The method also includes counting a use count value for each logical block, and dynamically adjusting mapping relations between the logical blocks and the logical zones according to the use count values. Accordingly, the logical block management method can effectively utilizing the logical zones to determine usage patterns of the logical blocks and use different mechanisms to write data, so as to increase the performance of the flash memory storage device.

SUMMARY OF THE INVENTION

An embodiment of the present invention that is described herein provides a method for data storage. The method includes providing a memory, which includes multiple groups of memory cells and is configured to concurrently store first data using a first storage configuration having a first access time, and second data using a second storage configuration having a second access time, longer than the first access time, such that each memory cell in each of the groups stores at least one bit of the first data and one or more bits of the second data. Data items are accepted for storage in the memory. The accepted data items are classified into a fast-access class and a normal-access class. The data items in the fast-access class are stored in the memory using the first storage configuration, and the data items in the normal-access class are stored in the memory using the second storage configuration.

In some embodiments, storing the data items using the first storage configuration includes storing the data items in Least Significant Bit (LSB) pages of the memory, and storing the data items using the second storage configuration includes storing the data items in Most Significant Bit (MSB) pages of the memory.

In a disclosed embodiment, classifying the data items includes classifying in the fast-access class frequently-accessed data items that are accessed with a first access frequency, and classifying in the normal-access class rarely-accessed data items that are accessed with a second access frequency, smaller than the first access frequency. In another embodiment, classifying the data items includes classifying management data in the fast-access class, and classifying user data in the normal-access class.

In another embodiment, classifying the data items includes classifying in the fast-access class first data items that are each mapped to a first number of physical pages of the memory, and classifying in the normal-access class second data items that are each mapped to a second number of the physical pages, higher than the first number.

In some embodiments, classifying the data items includes applying a predefined fixed classification of the data items into the fast-access class and the normal-access class. In an alternative embodiment, the data items are accepted from a host, and classifying the data items includes receiving from the host a classification of the data items into the fast-access class and the normal-access class. Further alternatively, classifying the data items includes adaptively determining a classification of the data items into the fast-access class and the normal-access class, by monitoring memory access operations applied to the data items.

In some embodiments, storing the data items includes buffering the data items belonging to the fast-access class in a first buffer, buffering the data items belonging to the normal-access class in a second buffer, and storing the data items buffered in the first and second buffers using the first and second storage configurations, respectively.

In an embodiment, storing the data items includes running a compaction process that copies data from one or more source blocks of the memory to one or more target block of the memory, such that the data items belonging to the fast-access class are stored in the target blocks using the first storage configuration, and the data items belonging to the normal-access class are stored in the target blocks using the second storage configuration.

Running the compaction process may include assigning respective grades to multiple blocks of the memory, such that the grade of a block is indicative of an access frequency of the data items stored in the block, and selecting candidate blocks to serve as the source blocks based on the grades. Additionally or alternatively, running the compaction process may include assigning respective grades to multiple blocks of the memory, such that the grade of a block is indicative of a match between a classification of the data items stored in the block to the fast-access and normal-access classes and actual storage configurations used for storing the data in the block, and selecting candidate blocks to serve as the source blocks based on the grades.

There is additionally provided, in accordance with an embodiment of the present invention apparatus for data storage including an interface and storage circuitry. The interface is coupled to communicate with a memory including multiple groups of memory cells and is configured to concurrently store first data using a first storage configuration having a first access time, and second data using a second storage configuration having a second access time, longer than the first access time, such that each memory cell in each of the groups holds at least one bit of the first data and one or more bits of the second data. The storage circuitry is configured to accept data items for storage in the memory, to classify the accepted data items into a fast-access class and a normal-access class, to store the data items in the fast-access class in the memory using the first storage configuration, and to store the data items in the normal-access class in the memory using the second storage configuration.

There is also provided, in accordance with an embodiment of the present invention, apparatus for data storage including a memory and storage circuitry. The memory includes multiple groups of memory cells and is configured to concurrently store first data using a first storage configuration having a first access time, and second data using a second storage configuration having a second access time, longer than the first access time, such that each memory cell in each of the groups holds at least one bit of the first data and one or more bits of the second data. The storage circuitry is configured to accept data items for storage in the memory, to classify the accepted data items into a fast-access class and a normal-access class, to store the data items in the fast-access class in the memory using the first storage configuration, and to store the data items in the normal-access class in the memory using the second storage configuration.

The present invention will be more fully understood from the following detailed description of the embodiments thereof, taken together with the drawings in which:

DETAILED DESCRIPTION OF EMBODIMENTS

Overview

Multi-Level Cell (MLC) memory devices comprise multiple memory cells, each memory cell holding two or more data bits. Different MLC bits typically have different access times. For example, in a typical 2 bits/cell MLC Flash device, groups of memory cells may each hold a Least Significant Bit (LSB) page having a fast access time and a Most Significant Bit (MSB) page having a longer access time. The LSB page and MSB page are sometimes referred to as "lower page" and "upper page," respectively.

Embodiments of the present invention that are described hereinbelow provide improved methods and systems for storing data in MLC memory devices. The disclosed techniques regard the MLC memory as capable of storing data using two different storage configurations—A normal storage configuration and a fast storage configuration. In a 2 bits/cell Flash device, for example, the fast storage configuration comprises storage in LSB pages, and the normal storage configuration comprises storage in MSB pages of the device.

Data items that are accepted for storage are classified into a fast-access class and a normal-access class, i.e., into items that should be stored with a fast access time and items that should be stored with a normal access time. The former data items are stored using the fast storage configuration (e.g., in the LSB pages), and the latter data items are stored using the normal storage configuration (e.g., in the MSB pages). In an example embodiment, the fast storage configuration is used for storing frequently-accessed (often referred to as "hot") data items, while the normal storage configuration is used for storing rarely-accessed ("cold") data items. By matching the storage configuration to the usage frequency of the data, the average access time of the memory can be reduced considerably.

In the disclosed techniques, the same groups of memory cells are used for storage with both fast and normal access time: Each memory cell of the memory holds at least one bit stored using the fast storage configuration and at least one bit stored using the normal storage configuration. In a typical example, both types of data items (fast access time and normal access time) are stored in different pages of the same erasure block of a MLC Flash device.

It is possible in principle to use two different memory types (e.g., an SLC device and an MLC device) for providing fast and normal access time, but this sort of solution is inefficient and inflexible. The disclosed techniques improve storage performance in comparison with traditional MLC solutions, simplify the memory and enable flexible allocation of storage space for storage with fast and normal access time, since they intermix the different storage configurations in the same memory device.

System Description

Figure 1:
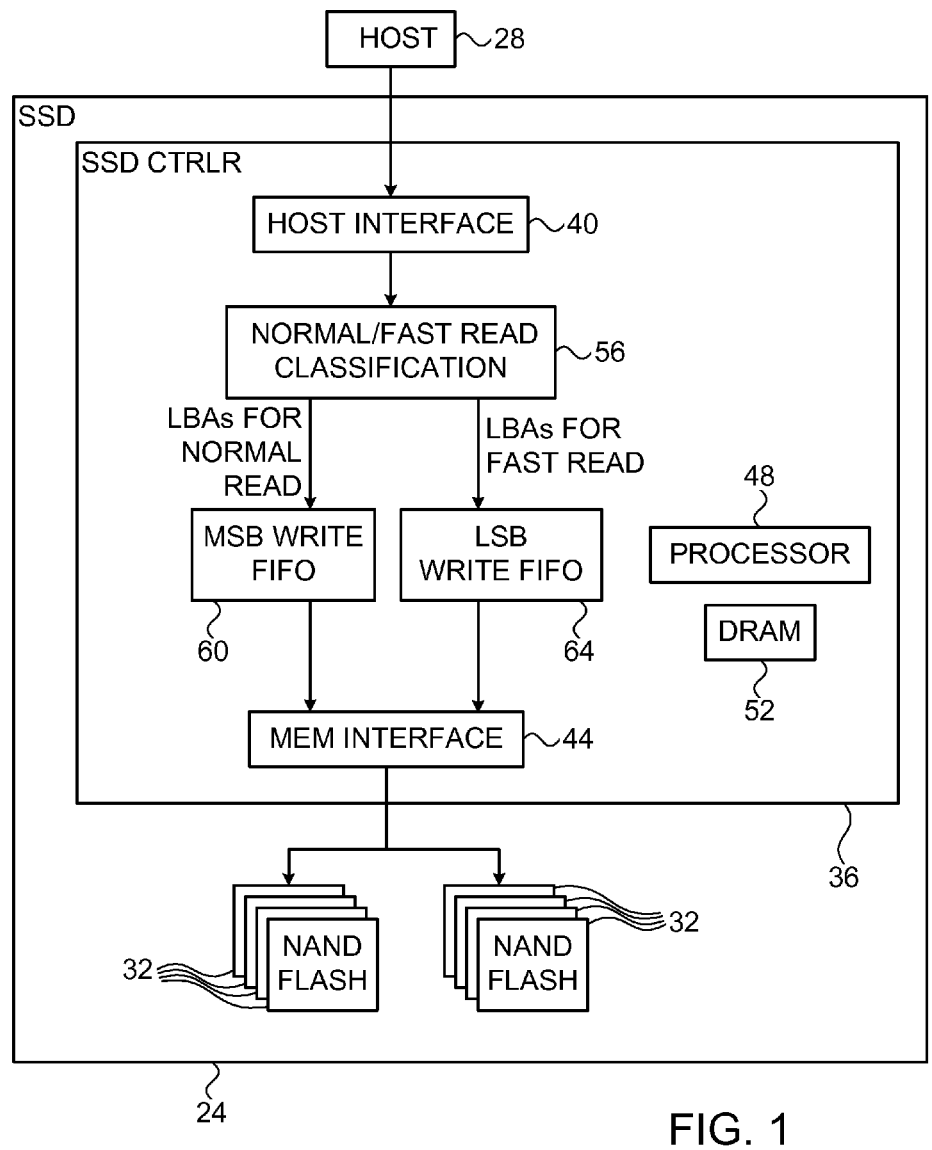
FIG. 1 is a block diagram that schematically illustrates a Solid State Drive (SSD), in accordance with an embodiment of the present invention.

FIG. 1 is a block diagram that schematically illustrates a Solid State Disk (SSD) 24, in accordance with an embodiment of the present invention. SSD 24 stores data on behalf of a host 28. Host 28 may comprise, for example, a host processor in an enterprise storage system comprising multiple SSDs 24, a host processor in computing device such as a notebook or laptop computer, or any other suitable host.

SSD 24 comprises an SSD controller 36, which stores data on behalf of host 28 in one or more non-volatile memory devices 32. SSD controller 36 comprises a host interface 40 for communicating with host 28, a memory interface 44 for communicating with memory devices 32, and a processor 48 that manages the operation of the SSD controller. SSD controller 36 further comprises an internal memory, in the present example a Dynamic Random Access Memory (DRAM) 52.

In the present example, memory devices 32 comprise Multi-Level Cell (MLC) NAND Flash devices or dies. Each memory device 32 comprises multiple memory cells that are arranged in erasure blocks (referred to as memory blocks or simply blocks for brevity). The memory cells of each block are erased together in a single erasure command.

Each block comprises multiple groups of memory cells that are written and read together. Depending on the memory device architecture, each group of memory cells may comprise, for example, an entire row of a given block, the odd-order memory cells in a certain row of a given block, the even-order memory cells in a certain row of a given block, or any other suitable group of memory cells that are read and written in a single command.

In the present example, memory devices 32 comprise 2 bits/cell devices. In such devices, each memory cell holds two bits of data, often referred to as Least Significant Bit (LSB) and Most Significant Bit (MSB). Each group of memory cells holds two pages—An LSB page that is stored in the LSBs of the memory cells in the group, and an MSB page that is stored in the MSBs of the memory cells in the group.

Each memory device 32 supports separate LSB and MSB read and write commands. Typically, LSB read and write commands are considerably faster than MSB read and write commands. In other words, the access time for LSB pages is considerably faster than the access time for the MSB pages. The term "access time" is used herein to refer to read and/or write latencies. The read and write latencies are typically measured from the time the read or write command is provided on the interface between the SSD controller and the memory device until the time the response is provided on that interface. In an example memory device, the LSB and MSB access times are given in the following table:

|  | LSB | MSB |
|---|---|---|
| Read latency | 50 μS | 100 μS |
| Write latency | 0.5 mS | 2 mS |

In some embodiments, SSD controller 36 accepts from host 28 data items for storage in memory devices 32. The SSD controller classifies the data items into a fast-access class and a normal-access class, in accordance with some classification criteria. The SSD controller stores the data items in the fast-access class in the LSB pages of memory devices 32, and stores the data items in the normal-access class in the MSB pages of the memory devices.

In the embodiment of FIG. 1, each data item is accepted from host 28 together with a respective logical address. The SSD controller translates the logical addresses into respective physical storage locations (e.g., physical pages) in memory devices 32 in accordance with a certain logical-to-physical address mapping, and stores each data item in the appropriate physical storage location. In the description that follows, both the data items and their respective logical addresses are referred to herein as Logical Block Addresses (LBAs). In alternative embodiments, however, any other suitable type of data items and addressing scheme can be used.

SSD controller 36 comprises a classification unit 56, which classifies the accepted LBAs into the fast-access and normal-access classes. The LBAs belonging to the different classes are then buffered in separate buffers, in the present example First-In First-Out (FIFO) memories. The LBAs belonging to the normal-access class (e.g., LBAs that should be read with normal read latency) are provided to an MSB write FIFO 60, and the LBAs belonging to the fast-access class (e.g., LBAs that should be read with fast read latency) are provided to an LSB write FIFO 64. SSD controller 36 stores the LBAs buffered in MSB write FIFO 60 in MSB pages of memory devices 32, and stores the LBAs buffered in LSB write FIFO 64 in LSB pages of the memory devices.

The SSD and SSD controller configurations of FIG. 1 are exemplary configurations, which are shown purely for the sake of conceptual clarity. In alternative embodiments, any other suitable SSD and SSD controller configurations can be used. For example, the embodiments described herein refer mainly to 2 bits/cell memory devices holding LSB and MSB pages. In alternative embodiments, memory devices 32 may comprise any other suitable type of memory having any suitable storage density and any suitable number of pages per memory group, e.g., 3 bits/cell, 4 bits/cell or 5 bits/cell memory.

Further alternatively, the memory devices may comprise any other suitable groups of memory cells that intermix fast-access-time and normal-access-time storage configurations in the same memory cells. In some embodiments, the memory may support a higher number of storage configurations having differing access times, and the accepted data items may be classified accordingly into a higher number of classes. For example, in an MLC memory storing three or more bits/cell, the fast-access class may correspond to the LSB pages, and the normal-access class may correspond to all other (higher-latency) pages.

Elements that are not necessary for understanding the principles of the present invention have been omitted from the figure for clarity. In the example configuration shown in FIG. 1, memory devices 32 and SSD controller 36 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD circuitry may reside on the same die on which one or more of the memory devices are disposed. Further alternatively, some or all of the functionality of the SSD controller can be implemented in software and carried out by host 28. In some embodiments, host 28 and SSD controller 36 may be fabricated on the same die, or on separate dies in the same device package.

Some or all of the functions of SSD controller 36 may be implemented in hardware. Alternatively, elements of the SSD controller, e.g., processor 48 or classification unit 56, may be implemented using one or more microprocessors that run suitable software, or a combination of hardware and software elements. In some embodiments, processor 48 comprises a general-purpose processor, which is programmed in software to carry out the functions described herein. The software may be downloaded to the processors in electronic form, over a network, for example, or it may, alternatively or additionally, be provided and/or stored on non-transitory tangible media, such as magnetic, optical, or electronic memory. The SSD controller circuitry, possibly in combination with some circuitry in memory devices 32, is referred to herein as storage circuitry that carries out the disclosed techniques.

Selective Data Storage in LSB and MSB Pages

In various embodiments, classification unit 56 in SSD controller 36 may classify the accepted LBAs into the normal-access and fast-access classes using different classification criteria. In one embodiment, unit 56 classifies LBAs that are accessed (e.g., read) frequently in the fast-access class, and LBAs that are accessed rarely in the normal-access class. When the host later accesses the various LBAs, the overall average access time is reduced considerably.

In the present context, the terms "frequently-accessed" and "rarely-accessed" do not imply any specific or absolute access frequency, but rather a relative relationship between access frequencies. In other words, data items may be classified as frequently-accessed and rarely-accessed in any suitable way, such that the access frequency of the frequently-accessed data items is higher than the access frequency of the rarely-accessed data items.

In another embodiment, unit 56 classifies management data (e.g., critical data and/or control data) in the fast-access class, and other data (e.g., user data) in the normal-access class. This criterion typically assumes that management data is accessed frequently. Further alternatively, unit 56 may classify the accepted data items in accordance with any other suitable classification criterion or combination of criteria.

Figure 2:
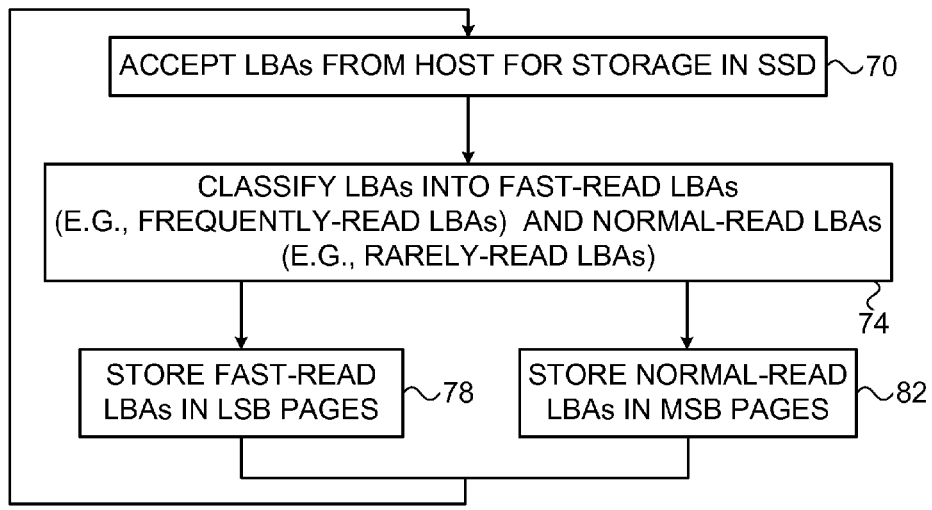
FIG. 2 is a flow chart that schematically illustrates a method for data storage in Multi-Level Cell (MLC) Flash memory, in accordance with an embodiment of the present invention.

FIG. 2 is a flow chart that schematically illustrates a method for data storage in SSD 24, in accordance with an embodiment of the present invention. The method begins with SSD controller 36 accepting LBAs for storage from host 28 via host interface 40, at an input step 70.

Classification unit 56 in the SSD controller classifies the accepted LBAs, at a classification step 74. Unit 56 classifies the LBAs into a fast-access class of LBAs that are to be accessed with small access time (e.g., frequently-read LBAs), and a normal-access class of LBAs that are to be accessed with normal access time (e.g., rarely-read LBAs). Unit 56 provides the LBAs in the fast-access class to LSB write FIFO 64, and the LBAs in the normal-access class to MSB write FIFO 60.

SSD controller 36 stores the LBAs buffered in LSB write FIFO 64 (e.g., frequently-read LBAs) in LSB pages of memory devices 32, at an LSB storage step 78. The SSD controller stores the LBAs buffered in MSB write FIFO 60 (e.g., rarely-read LBAs) in MSB pages of the memory devices, at an MSB storage step 82.

In some embodiments, the SSD controller programs a given group of memory cells (e.g., a row in a given block) by reading an entry from the LSB write FIFO and an entry from the MSB write FIFO, and storing the entries in the LSB page and the MSB page of the cell group, respectively. If one of the write FIFOs is empty, the SSD controller may store two entries from the other write FIFO in the LSB page and the MSB page of the cell group.

The method then loops back to step 70 above in which the SSD accepts subsequent LBAs from the host.

In some embodiments, the classification of LBAs into the normal-access and fast-access classes is fixed, i.e., a pre-configured classification that does not change over time. For example, unit 56 may be pre-configured with ranges of LBAs that are accessed frequently and other ranges of LBAs that are accessed rarely, and classify the accepted LBAs based on these ranges. This implementation is relatively simple and can be used, for example, with operating systems that store management data (that is accessed frequently) in predefined LBA ranges (e.g., at the low end of the LBA space).

In other embodiments, SSD controller 36 may be notified of the classification by host 28, over the interface between them. For example, the host may indicate to the SSD controller which LBA ranges are accessed frequently and which LBA ranges are accessed rarely. Indications of this sort may be provided to the SSD controller in advance, or together with each LBA that is sent for storage in the SSD.

Some storage protocols support commands that enable the host to provide such indications to the SSD. In some embodiments, host 28 and SSD controller 36 communicate using the NVM Express protocol that is specified, for example, in "NVM Express," revision 1.0b, Jul. 12, 2011, which is incorporated herein by reference. The NVM Express protocol specifies a Dataset Management (DSM) command, which is used by the host to indicate attributes for ranges of logical blocks. The attributes may comprise, for example, the frequency with which data is read or written and/or requested access latency for the data. See, for example, sections 6.6 and 6.8 and FIG. 121 of the NVM Express specification, cited above.

In some embodiments, unit 56 classifies the accepted LBAs based on the attributes provided in the DSM command. In a personal computer application, for example, the host may use the DSM command to specify the LBA range to be used as the computer's hibernation space. Unit 56 may optimize this LBA range for fast readout by storing the LBAs in this range in LSB pages. This technique reduces the computer wake-up time from hibernation.

In comparison with fixed classification, classification that is based on host notification is also relatively simple to implement but offers higher flexibility. This implementation can also be advantageous, for example, with operating systems that store management data in predefined LBA ranges (e.g., at the low end of the LBA space).

In alternative embodiments, processor 48 of SSD 24 determines the classification of LBAs adaptively and autonomously, irrespective of notifications from the host. Typically, processor 48 tracks the statistics of memory access (e.g., readout) operations performed on the various LBAs, and defines the classification accordingly. For example, processor 48 may apply any suitable technique for automatically distinguishing between frequently-accessed and rarely-accessed LBAs, and then map the LBAs to the fast-access and normal-access classes accordingly. In some embodiments this functionality is embedded in the Flash Translation Layer (FTL) implemented in processor 48. This dynamic mapping may be combined with the fixed or host-assisted methods described above.

In some embodiments, processor 48 maintains for each LBA or LBA range a respective read counter, and increments the counter for each read operation from the LBA or LBA range. The counters may have any desired number of bits, i.e., any desired resolution or size. In one embodiment each counter has a single bit (e.g., "0"=LBA not read, "1"=LBA read). In one embodiment, the counter of each LBA (or range) is stored as part of the entry of that LBA (or range) in the logical-to-physical address mapping. The logical-to-physical address mapping, including the counters, may be stored, for example, in DRAM 52.

In these embodiments, processor 48 classifies the LBAs based on their read counter values. For example, processor 48 may classify in the fast-access class the LBAs whose counter values exceed a certain threshold, and classify in the normal-access class the LBAs whose counter values are below the threshold. As a result, the frequently-accessed LBAs will be stored in LSB pages and the rarely-accessed LBAs will be stored in MSB pages.

Storage in LSB and MSB Pages During Block Compaction

In a typical Flash memory, data is written to memory devices 32 in page units, but erasure is applied to entire memory blocks. Data is written only to erased pages, and it is therefore not possible to update data in-place. Updating data involves writing the updated data to another physical storage location, marking the previous version of the data as invalid, and dynamically updating the logical-to-physical address mapping.

Because of the above characteristics, the memory blocks of memory devices 32 gradually accumulate invalid data pages, whose updated versions have been stored in other physical storage locations. In order to reduce the number of invalid pages, processor 48 of SSD controller 36 carries out a compaction, or "garbage collection" process. This background process selects one or more memory blocks (referred to as source blocks) for compaction, copies the valid data from the selected source blocks to other storage locations in one or more other blocks (referred to as target blocks), and then erases the source blocks. The erased blocks are then ready for subsequent programming.

In some embodiments, SSD controller 36 (e.g., processor 48 and/or unit 56) stores the data belonging to the fast-access class in LSB pages and the data belonging to the normal-access class in MSB pages as part of the compaction process. For example, when using the read counters described above, processor 48 initially resets the read counters. During data readout, processor 48 increments the read counters of the various LBAs.

When performing block compaction (when copying pages from one or more source blocks to one or more target blocks), processor 48 copies pages that belong to LBAs having high counter values to LSB pages in the target blocks, and copies pages that belong to LBAs having low counter values to MSB pages in the target blocks. After copying the pages, the read counters may be reset.

Additionally, in some embodiments processor 48 assigns to each block a respective readout grade that is indicative of:
- The frequency (e.g., frequently/rarely) with which the data in the block is read; and/or
- The degree of matching between the data distribution to the LSB and MSB pages in the block and the classification criterion (e.g., to what extent the LSB pages in the block really store frequently-read data and the MSB pages really store rarely-read data).

The readout grade of a block may be defined, for example, as the total number of readout operations of LSB pages from the block, minus the total number of readout operations of MSB pages from the block. Alternatively, any other suitable readout grade definition that meets the above guidelines can be used. In these embodiments, processor 48 assigns blocks having low grades high priority when selecting candidate blocks for compaction. The grade-based criterion may be combined with other selection criteria, such as the number of "holes" (regions of invalid data) or the number of invalid pages in the block.

Figure 3:
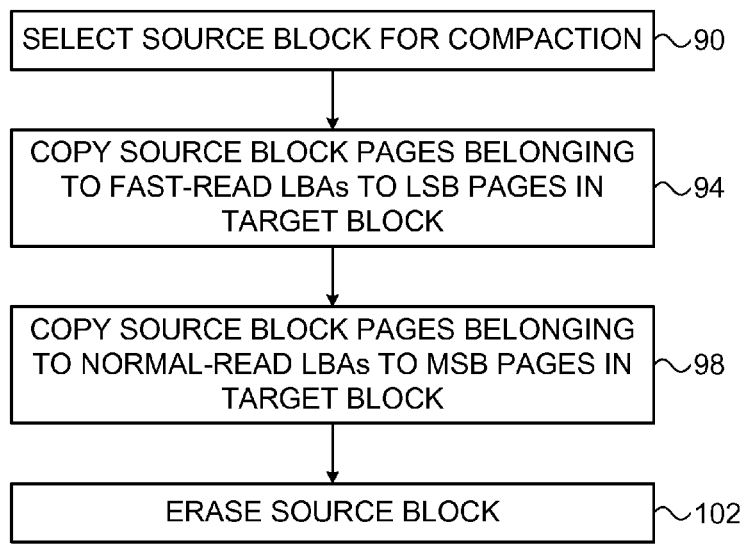
FIG. 3 is a flow chart that schematically illustrates a method for memory block compaction, in accordance with an embodiment of the present invention.

FIG. 3 is a flow chart that schematically illustrates a method for memory block compaction, in accordance with an embodiment of the present invention. The method begins with processor 48 of SSD controller 36 selecting a source block for compaction, at a candidate selection step 90. Processor 48 may select the source block, for example, based on the readout grade assigned to the block, as explained above.

Processor 48 copies the valid pages from the selected source block to a target block. In order to reduce readout latency, the processor copies pages of the source block that belong to the fast-access class to LSB pages in the target block, at an LSB copying step 94. Pages of the source block that belong to the normal-access class are copied to MSB pages in the target block, at an MSB copying step 98. Processor 48 then erases the source block, at an erasure step 102.

The example above refers to a compaction process that copies data from a single source block to a single target block. Generally, however, the compaction process may copy data jointly from any desired number of source blocks to any desired number of target blocks. Increasing the number of source blocks may improve the compaction efficiency.

Consider, for example, a pair of blocks, one block comprising a high percentage of frequently-read pages and the other block comprising only a small percentage of frequently-read pages. Compacting the two blocks jointly will typically be considerably more efficient than compacting each block separately. Such a joint compaction process would typically store the frequently-read pages (mostly from the first source block) in LSB pages of the target block(s), and the rarely-read pages (mostly from the second source block) in MSB pages of the target block(s).

Although the embodiments described herein mainly address storing fast-access data in LSB pages and normal-access data in MSB pages, the methods and systems described herein can also be used in other storage configurations. For example, the fast-access storage configuration may comprise storing the data (e.g., LBA) in a small number of physical pages (e.g., in a single physical page), and the normal-access storage configuration may comprise splitting the data over a larger number of physical pages.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage in a memory, wherein the memory includes multiple groups of memory cells and is configured to concurrently store first data using a first storage configuration having a first access time, and second data using a second storage configuration having a second access time, longer than the first access time, such that each memory cell in each of the groups stores at least one bit of the first data and one or more bits of the second data, the method comprising:
- accepting data items for storage in the memory;
- classifying the accepted data items into a fast-access class and a normal-access class, wherein frequently read data items are classified as fast-access class and less frequently read data items are classified as normal-access class;
- storing the data items classified as fast-access class into blocks of the memory using the first storage configuration;
- storing the data items classified as normal-access class into blocks of the memory using the second storage configuration;
- tracking a frequency of read accesses of each of the stored data items;
- selecting two or more candidate blocks of the memory to serve as source blocks for a compaction process dependent upon the tracked frequencies of read accesses of stored data items in each of the candidate blocks;
- copying data items in the source blocks with tracked frequencies above a pre-determined threshold to target blocks using the first storage configuration;
- copying data items in the source blocks with tracked frequencies below a pre-determined threshold to the target blocks using the second storage configuration.

2. The method according to claim 1, wherein storing the data items using the first storage configuration comprises storing the data items in Least Significant Bit (LSB) pages of the memory, and wherein storing the data items using the second storage configuration comprises storing the data items in Most Significant Bit (MSB) pages of the memory.

3. The method according to claim 1, wherein classifying the accepted data items comprises classifying management data in the fast-access class, and classifying user data in the normal-access class.

4. The method according to claim 1, wherein classifying the accepted data items comprises classifying in the fast-access class first data items that are each mapped to a first number of physical pages of the memory, and classifying in the normal-access class second data items that are each mapped to a second number of the physical pages, higher than the first number.

5. The method according to claim 1, wherein classifying the accepted data items comprises applying a predefined classification of the data items into the fast-access class and the normal-access class.

6. The method according to claim 1, wherein the data items are accepted from a host, and wherein classifying the accepted data items comprises receiving from the host a classification of the data items into the fast-access class and the normal-access class.

7. The method according to claim 1, wherein storing the data items comprises buffering the data items belonging to the fast-access class in a first buffer, buffering the data items belonging to the normal-access class in a second buffer, and storing the data items buffered in the first and second buffers using the first and second storage configurations, respectively.

8. The method according to claim 1, wherein tracking the frequency of read accesses of each of the stored data items comprises using a read counter to track an access frequency of data items in each block of multiple blocks of the memory and assigning respective grades to the multiple blocks of the memory, such that the grade of a given block is indicative of the access frequency of the data items stored in the given block, and selecting the candidate blocks to serve as the source blocks based on the grades.

9. The method according to claim 8, wherein tracking the frequency of read accesses of each of the stored data items further comprises adjusting the respective grades to each block of the multiple blocks of the memory, such that the grade of the given block is also indicative of a match between a classification of the data items stored in the given block to the fast-access and normal-access classes and actual storage configurations used for storing the data in the given block, and selecting the candidate blocks to serve as the source blocks based on the grades.

10. Apparatus for data storage, comprising:
an interface, which is coupled to communicate with a memory comprising multiple groups of memory cells and is configured to concurrently store first data using a first storage configuration having a first access time, and second data using a second storage configuration having a second access time, longer than the first access time, such that each memory cell in each of the groups holds at least one bit of the first data and one or more bits of the second data; and
storage circuitry, which is configured to:
accept data items for storage in the memory;
classify the accepted data items into a fast-access class and a normal-access class, wherein frequently read data items are classified as fast-access class and less frequently read data items are classified as normal-access class;
store the data items classified as fast-access class into blocks of the memory using the first storage configuration;
store the data items classified as normal-access class into blocks of the memory using the second storage configuration;
track a frequency of read accesses of each of the stored data items;
select two or more candidate blocks of the memory to serve as source blocks for a compaction process dependent upon the tracked frequencies of read accesses of stored data items in each of the candidate blocks;
copy data items in the source blocks with tracked frequencies above a pre-determined threshold to target blocks using the first storage configuration; and
copy data items in the source blocks with tracked frequencies below a pre-determined threshold to the target blocks using the second storage configuration.

11. The apparatus according to claim 10, wherein the storage circuitry is further configured to store the data items using the first storage configuration by storing the data items in Least Significant Bit (LSB) pages of the memory, and to store the data items using the second storage configuration by storing the data items in Most Significant Bit (MSB) pages of the memory.

12. The apparatus according to claim 10, wherein the storage circuitry is further configured to classify management data items in the fast-access class, and to classify user data items in the normal-access class.

13. The apparatus according to claim 10, wherein the storage circuitry is further configured to classify in the fast-access class first data items that are each mapped to a first number of physical pages of the memory, and to classify in the normal-access class second data items that are each mapped to a second number of the physical pages, higher than the first number.

14. The apparatus according to claim 10, wherein the storage circuitry is further configured to apply a predefined classification of the data items into the fast-access class and the normal-access class.

15. The apparatus according to claim 10, wherein the storage circuitry is further configured to accept the data items from a host, and to receive from the host a classification of the accepted data items into the fast-access class and the normal-access class.

16. The apparatus according to claim 10, wherein the storage circuitry includes first and second buffers, and wherein the storage circuitry is further configured to buffer the data items belonging to the fast-access class in the first buffer, to buffer the data items belonging to the normal-access class in the second buffer, and to store the data items buffered in the first and second buffers using the first and second storage configurations, respectively.

17. The apparatus according to claim 10, wherein the storage circuitry is further configured to use a read counter to track an access frequency of data items in each block of multiple blocks of the memory and to assign respective grades to the multiple blocks of the memory, such that the grade of a given block is indicative of the access frequency of the data items stored in the given block, and to select the candidate blocks to serve as the source blocks based on the grades.

18. The apparatus according to claim 17, wherein the storage circuitry is further configured to adjust the respective grades to each block of the multiple blocks of the memory, such that the grade of the given block is also indicative of a match between a classification of the data items stored in the given block to the fast-access and normal-access classes and actual storage configurations used for storing the data in the given block, and to select the candidate blocks to serve as the source blocks based on the grades.

19. Apparatus for data storage, comprising:
a memory, which comprises multiple groups of memory cells and is configured to concurrently store first data using a first storage configuration having a first access time, and second data using a second storage configuration having a second access time, longer than the first access time, such that each memory cell in each of the groups holds at least one bit of the first data and one or more bits of the second data; and storage circuitry, which is configured to:

accept data items for storage in the memory;

classify the accepted data items into a fast-access class and a normal-access class, wherein frequently read data items are classified as fast-access class and less frequently read data items are classified as normal-access class;

store the data items classified as fast-access class into blocks of the memory using the first storage configuration;

store the data items classified as normal-access class into blocks of the memory using the second storage configuration;

track a frequency of read accesses of each of the stored data items;

select two or more candidate blocks of the memory to serve as source blocks for a compaction process dependent upon the tracked frequencies of read accesses of stored data items in each of the candidate blocks;

copy data items in the source blocks with tracked frequencies above a pre-determined threshold to target blocks using the first storage configuration; and copy data items in the source blocks with tracked frequencies below a pre-determined threshold to the target blocks using the second storage configuration.

20. The apparatus according to claim 19, wherein the storage circuitry is further configured to:

store the data items using the first storage configuration by storing the data items in Least Significant Bit (LSB) pages of the memory; and store the data items using the second storage configuration by storing the data items in Most Significant Bit (MSB) pages of the memory.

21. The apparatus according to claim 19, wherein the storage circuitry is further configured to:

classify management data in the fast-access class; and classify user data in the normal-access class.

22. The apparatus according to claim 19, wherein the storage circuitry is further configured to:

accept the data items from a host; and receive from the host a classification of the data items into the fast-access class and the normal-access class.

23. The apparatus according to claim 19, wherein the storage circuitry includes first and second buffers, and wherein the storage circuitry is further configured to:

buffer the data items belonging to the fast-access class in the first buffer;

buffer the data items belonging to the normal-access class in the second buffer; and store the data items buffered in the first and second buffers using the first and second storage configurations, respectively.

24. The apparatus according to claim 19, wherein the storage circuitry is further configured to:

use a read counter to track an access frequency of data items in each block of multiple blocks of the memory assign respective grades to the multiple blocks of the memory, such that the grade of a given block is indicative of the access frequency of the data items stored in the given block; and select the candidate blocks to serve as the source blocks based on the grades.

25. The apparatus according to claim 24, wherein the storage circuitry is further configured to:

adjust the respective grades to each block of the multiple blocks of the memory, such that the grade of the given block is also indicative of a match between a classification of the data items stored in the given block to the fast-access and normal-access classes and actual storage configurations used for storing the data in the given block; and select the candidate blocks to serve as the source blocks based on the grades.

* * * * *